United States Patent
Chin et al.

(10) Patent No.: US 6,885,822 B1
(45) Date of Patent: Apr. 26, 2005

(54) WAVELENGTH AND FILTER ARRANGEMENT FOR WDM NETWORKS

(75) Inventors: Hon Wah Chin, Palo Alto, CA (US); Rohit Sharma, Sunnyvale, CA (US); Holden Jessup, Palo Alto, CA (US); Denis Zaccarin, Sunnyvale, CA (US)

(73) Assignee: Ciena Corporation, Linthicum, MD (US)

( * ) Notice: Subject to any disclaimer, the term of this patent is extended or adjusted under 35 U.S.C. 154(b) by 595 days.

(21) Appl. No.: 09/875,243

(22) Filed: Jun. 5, 2001

Related U.S. Application Data

(60) Provisional application No. 60/210,231, filed on Jun. 6, 2000.

(51) Int. Cl.[7] .............................. G02F 1/00; H04B 10/20
(52) U.S. Cl. ................................ 398/59; 398/3; 398/4; 398/5
(58) Field of Search ............................. 398/3, 4, 5, 59, 398/67; 370/223

(56) References Cited

U.S. PATENT DOCUMENTS

| | | | | |
|---|---|---|---|---|
| 6,084,694 A | * | 7/2000 | Milton et al. | 398/83 |
| 6,249,510 B1 | * | 6/2001 | Thompson | 370/223 |
| 6,473,397 B1 | * | 10/2002 | Au | 370/223 |
| 6,525,852 B1 | * | 2/2003 | Egnell | 398/83 |

* cited by examiner

*Primary Examiner*—M. R. Sedighian
*Assistant Examiner*—Dzung Tran
(74) *Attorney, Agent, or Firm*—Michael R. Cammarata; Horace H. Ng

(57) ABSTRACT

In a ring having first and second adjacent nodes, and two fibers carrying information between the first and second nodes, the first fiber carries information in one direction, while the second fiber carries information in another direction. Each fiber includes wavelength capacity allocated to working and protection traffic. The working and protection wavelength capacities in the first fiber are respectively assigned to first and second disjoint sets of wavelengths, while the working and protection wavelength capacities in the second fiber are respectively assigned to the second and first disjoint sets of wavelengths.

17 Claims, 6 Drawing Sheets

| ITU Grid No | Freq. (THz) | λ (nm) | Band | Chan |
|---|---|---|---|---|
| 60 | 196.0 | 1529.55 | 1 | 1 |
| 59 | 195.9 | 1530.33 | 1 | 2 |
| 58 | 195.8 | 1531.11 | 1 | 3 |
| 57 | 195.7 | 1531.90 | (skip) | (skip) |
| 56 | 195.6 | 1532.68 | 2 | 1 |
| 55 | 195.5 | 1533.46 | 2 | 2 |
| 54 | 195.4 | 1534.25 | 2 | 3 |
| 53 | 195.3 | 1535.03 | (skip) | (skip) |
| 52 | 195.2 | 1535.82 | 3 | 1 |
| 51 | 195.1 | 1536.61 | 3 | 2 |
| 50 | 195.0 | 1537.40 | 3 | 3 |
| 49 | 194.9 | 1538.18 | (skip) | (skip) |
| 48 | 194.8 | 1538.97 | 4 | 1 |
| 47 | 194.7 | 1539.76 | 4 | 2 |
| 46 | 194.6 | 1540.56 | 4 | 3 |
| 45 | 194.5 | 1541.35 | (skip) | (skip) |
| 44 | 194.4 | 1542.14 | 5 | 1 |
| 43 | 194.3 | 1542.93 | 5 | 2 |
| 42 | 194.2 | 1543.73 | 5 | 3 |
| 41 | 194.1 | 1544.52 | (skip) | (skip) |
| 40 | 194.0 | 1545.32 | 6 | 1 |
| 39 | 193.9 | 1546.12 | 6 | 2 |
| 38 | 193.8 | 1546.92 | 6 | 3 |
| 37 | 193.7 | 1547.71 | (skip) | (skip) |

| ITU Grid No | Freq. (THz) | λ (nm) | Band | Chan |
|---|---|---|---|---|
| 36 | 193.6 | 1548.51 | 7 | 1 |
| 35 | 193.5 | 1549.31 | 7 | 2 |
| 34 | 193.4 | 1550.11 | 7 | 3 |
| 33 | 193.3 | 1550.92 | (skip) | (skip) |
| 32 | 193.2 | 1551.72 | 8 | 1 |
| 31 | 193.1 | 1552.52 | 8 | 2 |
| 30 | 193.0 | 1553.33 | 8 | 3 |
| 29 | 192.9 | 1554.13 | (skip) | (skip) |
| 28 | 192.8 | 1554.94 | 9 | 1 |
| 27 | 192.7 | 1555.75 | 9 | 2 |
| 26 | 192.6 | 1556.55 | 9 | 3 |
| 25 | 192.5 | 1557.36 | (skip) | (skip) |
| 24 | 192.4 | 1558.17 | 10 | 1 |
| 23 | 192.3 | 1558.98 | 10 | 2 |
| 22 | 192.2 | 1559.79 | 10 | 3 |
| 21 | 192.1 | 1560.60 | (skip) | (skip) |
| 20 | 192.0 | 1561.42 | 11 | 1 |
| 19 | 191.9 | 1562.23 | 11 | 2 |
| 18 | 191.8 | 1563.05 | 11 | 3 |

FIG-6

WAVELENGTH AND FILTER ARRANGEMENT FOR WDM NETWORKS

CROSS-REFERENCE TO RELATED APPLICATION

The present application claims the benefit of priority under 35 U.S.C. § 119 from the provisional patent application, U.S. patent application Ser. No. 60/210,231, filed on Jun. 6, 2000, the disclosure of which, including all attached documents, is hereby incorporated by reference as if set forth in full in this document for all purposes.

BACKGROUND OF THE INVENTION

The present invention relates generally to fiber optic communications, and more specifically to techniques used in connection with wavelength assignment, wavelength filtering, and protection switching in wavelength division multiplexing (WDM) networks.

Photonic transmission, amplification, and switching techniques provide flexible means of provisioning, configuring, and managing modern high capacity telecommunication networks. The physical layer in the network, which includes the transmission equipment and the fiber layer used for signal transport, needs to be reconfigurable in order to support dynamic routing of traffic. While slow reconfiguration (taking on the order of minutes or more) may be sufficient for rearranging traffic capacity in response to change in demand patterns across the network, rapid reconfiguration (perhaps 50 ms or less) is required for restoring services in the case of transmission equipment or fiber cable facility failures. Fast restoration is also critical to prevent escalation of the effects of a single point of failure where the affected services (voice and data) attempt to reconnect immediately following disruption of services and may lead to overloading of facilities adjacent or connected to the point of original failure. With the introduction of multi-wavelength channels in a single fiber, these multi-wavelength channels need to be managed in order to achieve fast restoration.

In addition to the critical need for fast restoration, the capacity that needs to be re-routed has increased rapidly with the continuing increase in data rates for optical transmission and the introduction of multi-wavelength channels on a single fiber. For example, the rapid growth in traffic capacities required for long haul telecommunications networks have accelerated the introduction of new technologies for transmission and multiplexing. Transmission links up to bit rates of 10 Gbps (OC-192) are in commercial service and new developments in multi-wavelength component technologies are resulting in increased commercial availability of 4-, 8-, 16-, 32-, and 40-channel WDM (wavelength division multiplex) links (at 2.5 Gbps per wavelength or more). As the demand for more bandwidth continues, it would be desirable to provide techniques which allow additional multi-wavelength channels with a single fiber to be utilized. Moreover, as the number of multi-wavelength channels within a single fiber increases, it would be desirable to develop techniques to more efficiently multiplex and demultiplex these multi-wavelength channels.

Transmission of high data rates over single fibers also results in making the network more vulnerable to failures of larger magnitude. For example, a single fiber link failure can disrupt approximately 130,000 voice channels (DS0) when the fiber link is operating at 10 Gbps on a single-wavelength or at 2.5 Gbps on each of four wavelengths. Consequently, redundant facilities provisioned for dynamic restoration of service also need to provide a similar magnitude of capacity on the links used as backup or spare links for ensuring network survivability.

Therefore, techniques used in connection with network restoration must provide solutions that are compatible with the twofold requirement of fast switching and high capacity. Various aspects of optical switching in WDM networks are further described in U.S. Pat. No. 6,046,833, the entire disclosure of which, including microfiche appendices, is incorporated by reference in its entirety for all purposes.

SUMMARY OF THE INVENTION

The present invention provides techniques for efficient wavelength management and filtering in an optical network.

One aspect of the invention can be implemented in the context of a two-fiber O-BLSR (optical bi-directional line switched ring). In such a ring having first and second adjacent nodes, two fibers carry information between the first and second nodes. The first fiber carries information in a so-called clockwise direction from the first node to the second node, while the second fiber carries information in a so-called counter-clockwise direction from the second node to the first node. Each fiber includes wavelength capacity allocated to working and protection traffic. In accordance with this aspect of the invention, the working and protection wavelength capacities in, the first fiber are respectively assigned to first and second disjoint sets of wavelengths, while the working and protection wavelength capacities in the second fiber are respectively assigned to the second and first disjoint sets of wavelengths. The first and second sets of wavelengths are disjoint, i.e., there are no common wavelengths between the two sets. The two sets can be wavelengths in two non-overlapping ranges, or the wavelengths in the two sets can be interleaved. Thus, when working traffic on one of the fibers needs to be switched to the protection wavelength capacity of the other fiber to travel the ring in the opposite direction, there is no need for wavelength conversion since the wavelengths of the working wavelength capacity in one direction are the same as those of the protection wavelength capacity in the opposite direction.

Another aspect of the invention can be implemented in the context of demultiplexing the two disjoint sets of wavelengths. Typically, two distinct adjacent ranges of wavelengths can be separated with one or more dichroic filters. However, since filters do not have infinitely sharp cutoffs, a range of wavelengths near the cutoff (the boundary region) of a dichroic filter are partially transmitted and partially reflected, and therefore cannot be usefully retrieved. However, according to this aspect of the invention, the wavelengths in this boundary region are usefully retrieved by interposing a narrow band drop filter to separate the wavelengths in the boundary region prior to having the remaining wavelengths encounter the dichroic filter(s).

Yet another aspect of the invention can be implemented in the context of demultiplexing three wavelength channels separated by a particular frequency within a band. Typically, three band-pass filters, each being sufficiently narrow so as to eliminate crosstalk between the wavelength channels would be used. However, if the center wavelength channel is first removed using a narrow band-pass filter, the remaining two wavelength channels can be separated using two wider (i.e., less expensive) filters.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings. In the drawings, like reference numbers indicate identical or functionally similar elements.

BRIEF DESCRIPTION OF THE DRAWINGS

FIG. 6 is a table showing an International Telecommunications Union (ITU) band and channel plan;

DESCRIPTION OF THE SPECIFIC EMBODIMENTS

Figure 1:
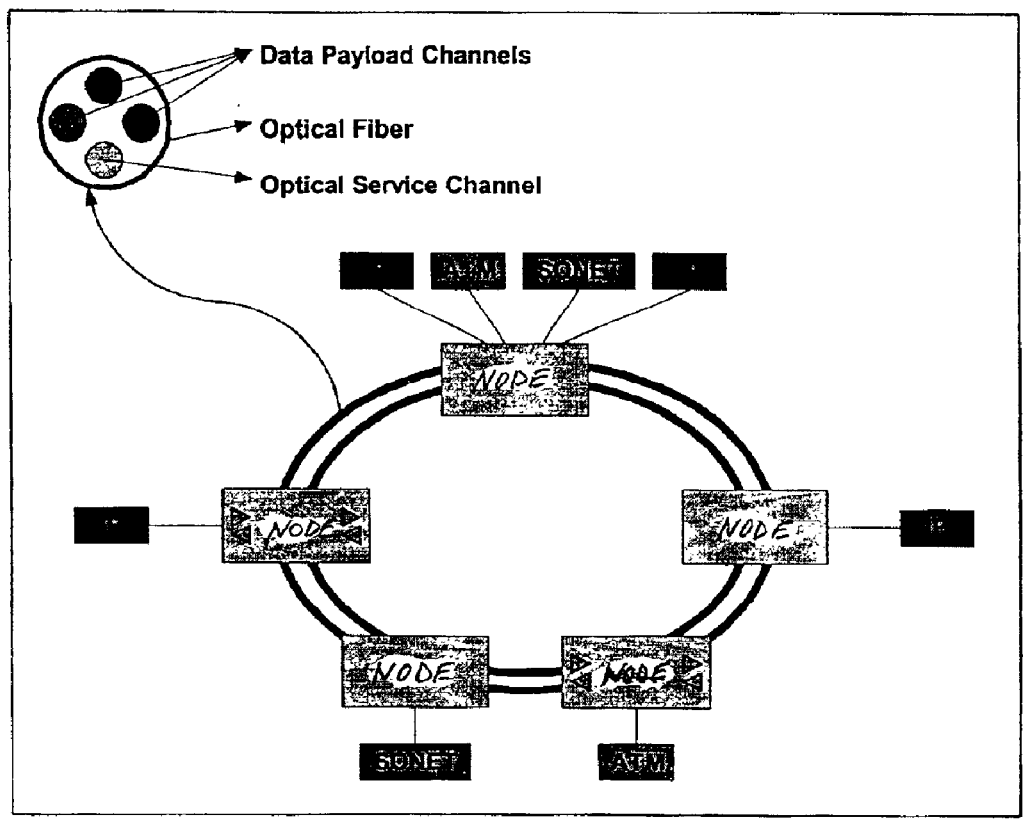
FIG. 1 is a simplified diagram of a two-fiber optical bi-directional line switched ring.

Referring to FIG. 1, there is shown a two-fiber optical bi-directional line switched ring (O-BLSR) 10. Ring 10 includes a plurality of nodes 20 which are interconnected by fibers 25. Each node can send and receive signals to and from adjacent nodes on ring 10. The nodes are designated 20a, 20b, 20c etc. In addition, terminal equipment, such as IP, ATM and SONET equipment, can be connected to a node to send and receive traffic from ring 10.

Each pair of adjacent nodes is connected by two fibers. Each fiber 25 carries a number of wavelength channels, including a number of data payload channels and an optical service channel (OSC). The data payload channels are bit-rate and protocol independent thus allowing the transport of various types of traffic such as IP, ATM and/or SONET traffic. The OSC is used for node-to-node communication to facilitate various network operations ranging from protection switching to customized configuration.

The nomenclature regarding fibers 25 is that a fiber for propagating signals from a given node to an adjacent node is provided with the suffix comprising the letter suffix of the originating node and the receiving node. For example, node 20a sends signals to node 20b on fiber 25ab and receives signals from node 20b on fiber 25ba.

While from the point of view of ring 10, the directions are referred to as "clockwise" and "counter-clockwise," from a node's point of view, the two directions are arbitrarily designated "upstream" and "downstream," or "west" or "east."

Figure 2:
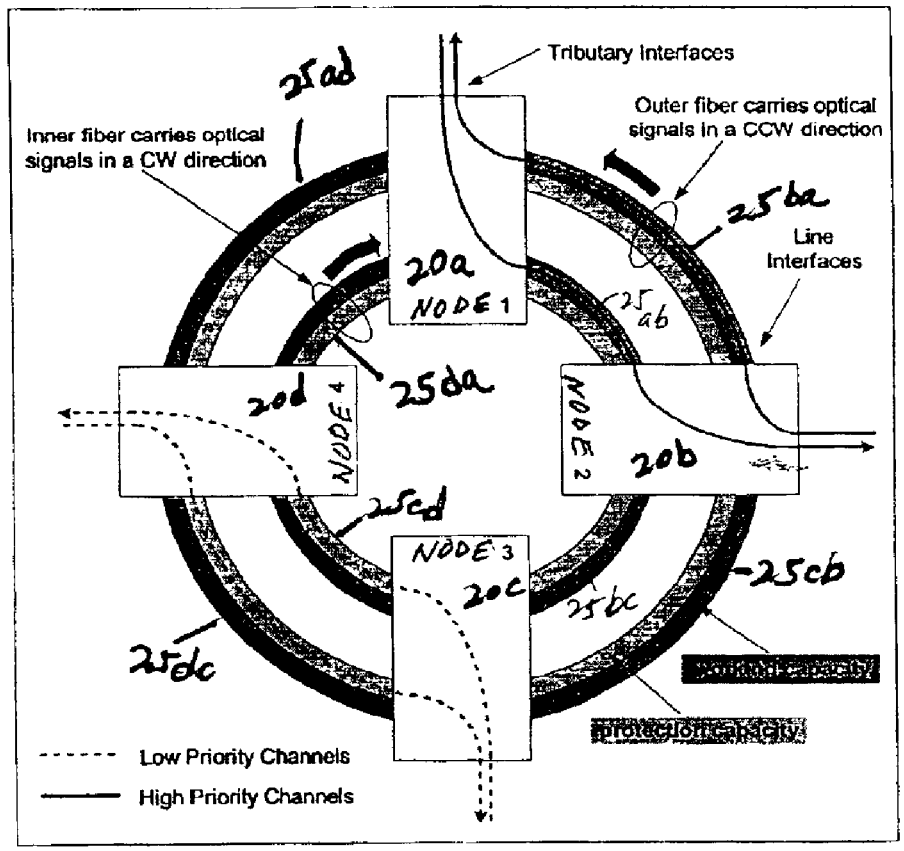
FIG. 2 is another simplified diagram of a two-fiber optical bi-directional line switched ring.

FIG. 2 is a schematic of a two-fiber bi-directional line switch ring showing the wavelength capacities of fibers 25. As shown therein, traffic is inserted into and extracted from ring 10 via nodes 20a–d. Connections to and from ring 10 are made via "tributary" interfaces or ports, and channels connected to these ports are known as tributary channels. Connections within ring 10 are made via "line" interfaces or ports, and channels connected to these ports are known as line channels.

Tributary channels may include channels from the terminal equipment such as IP, ATM or SONET equipment. A signal inputted into a tributary channel is multiplexed (or added) into fiber 25 and routed around ring 10 until it reaches its destination node, where it is demultiplexed (or dropped) and sent out to the appropriate tributary port. Thus, when a wavelength channel enters a node 20 from within ring 10 (i.e., via the line interface), it is either dropped at that node, or is passed through that node to be dropped later in ring 10. Likewise, a wavelength channel that leaves a node via the line interface has either been added at that node or has been passed through that node.

Each fiber 25 includes wavelength capacity allocated to working and protection traffic. Preferably, equal wavelength capacity is allocated to working and protection traffic. In one embodiment, the counter-clockwise fiber, for example, fibers 25ba, 25cb, 25dc, etc., carries signals in a counter-clockwise direction and the clockwise fiber, for example, fibers 25ab, 25bc, 25dc, etc., carries signals in a clockwise direction.

When ring 10 goes into a "protect" state, signals from affected wavelength channels that normally travel clockwise around ring 10 are switched to travel counter-clockwise around some portion of ring 10 to avoid the point of failure triggering the "protection." Similarly, signals from affected wavelength channels that normally travel counter-clockwise around ring 10 are switched to travel clockwise.

Figure 3:
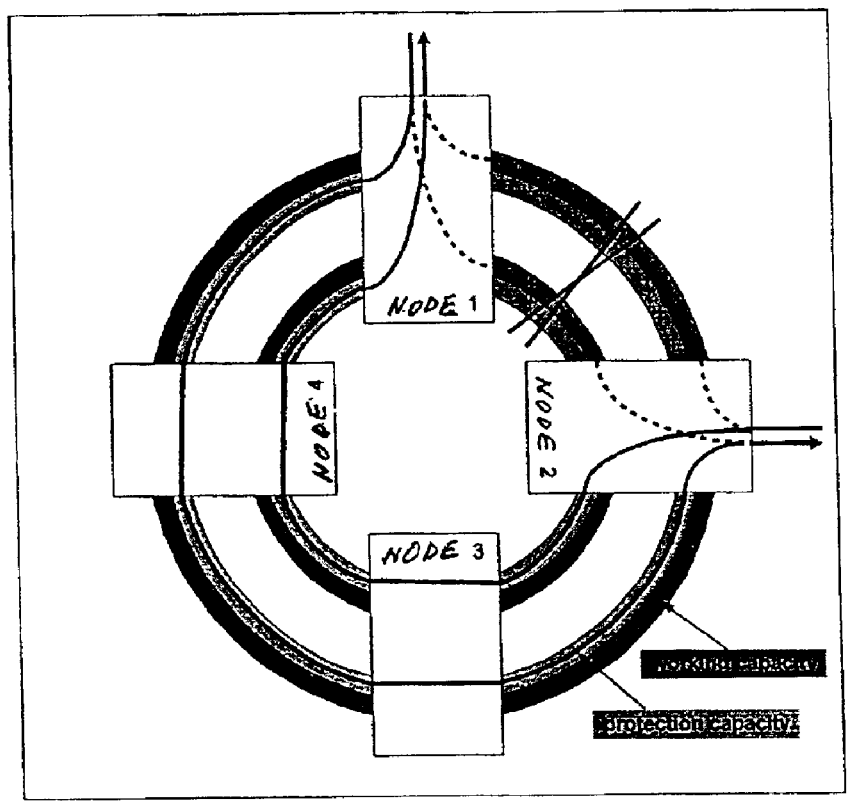
FIG. 3 is a simplified diagram showing re-routing of channels when a failure occurs in a two-fiber optical bi-directional line switched ring.

FIG. 3 is a schematic showing re-routing of wavelength channels when a failure occurs in ring 10. In the event of a fiber failure in ring 10 (e.g., a fiber break), signals from the affected high-priority or working channels are re-routed around ring 10 by the two nodes 20a and 20b at either side of the failure. More specifically, node 20b switches signals from the affected working channels to the low-priority or protection channels on fibers 25bc and 25cb exiting node 20b on the downstream or east side. Likewise, node 20a switches signals from the affected working channels to the protection channels on fibers 25ad and 25da exiting node 20b on the upstream or west side. Signals which normally traverse the affected working channels can now propagate between node 20b and node 20a via nodes 20c and 20d.

As will be explained further below, to minimize the disturbance of the traffic already traveling counter-clockwise, the wavelengths for "working" traffic traveling clockwise on the clockwise fiber are reserved on the counter-clockwise fiber for "protect" traffic, and similarly, wavelengths for "working" traffic traveling counter-clockwise on the counter-clockwise fiber are reserved on the clockwise fiber for "protect" traffic.

Figure 4:
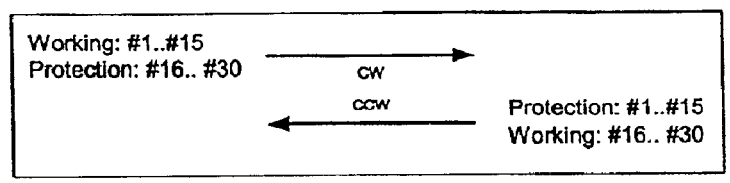
FIG. 4 is a simplified diagram illustrating an exemplary way to allocate wavelengths in the two fibers of the two-fiber optical bi-directional line switched ring.

The working and protect wavelengths are different in the clockwise fiber and the counter-clockwise fiber. FIG. 4 shows an exemplary scheme to allocate these wavelengths. As shown therein, wavelengths 1–15 are used to carry working traffic on the clockwise fiber, while wavelengths 1–15 are used for protect traffic on the counter-clockwise fiber. Likewise, wavelengths 16–30 are used to carry working traffic on the counter-clockwise fiber, while wavelengths 16–30 are used for protect traffic on the clockwise fiber. By using this scheme, the need for wavelength conversion is obviated during protection switching. However, it should be understood that the wavelengths allocated to carry a particular type of traffic do not have to be contiguous. For example, alternatively, a group of "odd" or "even" wavelengths can be allocated to carry a particular type of traffic.

As described above, when ring 10 goes into a "protect" state, which is triggered by, for example, a fiber failure, signals from affected working channels on the counter-clockwise fiber are switched to travel on protection channels on the clockwise fiber and signals from affected working channels on the clockwise fiber are switched to travel on protection channels on the counter-clockwise fiber. By using the wavelength allocation scheme as described above, it is evident that wavelength conversion is not required during protection switching. Signals from the affected working channels can be directed to travel on the protection channels without involving any wavelength conversion equipment, since the affected working channels in one fiber share the same wavelengths as the protection channels in the other fiber.

As mentioned above, the bandwidth (or portions thereof) of each fiber 25 is divided into two disjoint sets of wavelengths, i.e., no common wavelengths between the two sets. These two sets of wavelengths are designated as "working" and "protect" respectively. As will be further described below, the two sets can be wavelengths in two non-overlapping ranges, or the wavelengths in the two sets can be interleaved. Wavelengths within each of the two sets are further subdivided or grouped into "bands." The manner in which these wavelengths are grouped together defines the "band plan."

Figure 5:
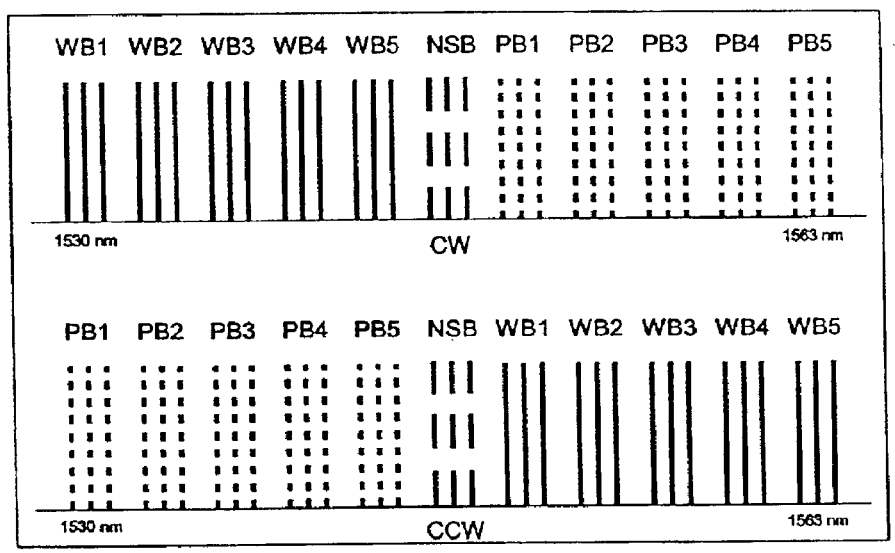
FIG. 5 is a diagram illustrating an exemplary band plan in accordance with the present invention.

FIG. 5 is a diagram illustrating an exemplary band plan for the clockwise and counter-clockwise fibers. In an exemplary embodiment, there are three (3) adjacent wavelength channels in a band and these bands are superimposed on a wavelength range spanning forty-three (43) channels. Preferably, in order to allow sufficient isolation between bands, several of these 43 channels are not used. For example, in each fiber 25, there are eleven (11) usable bands, namely, five (5) working bands, five (5) protect bands, and one (1) non-switched band. The working bands and the protect bands in each fiber 25 are symmetrically arranged around the non-switched band. That is, in the clockwise fiber, bands 1–5 are designated as working bands, band 6 is designated as the non-switched band, and bands 7–11 are designated as the protect bands; and in the counter-clockwise fiber, bands 1–5, 6 and 7–11 are respectively designated as the protect bands, the non-switched band, and the working bands. It is to be understood that this assignment of bands into working and protect bands can be generalized to any convenient partition of the available bands into two disjoint sets.

Following the exemplary wavelength assignment scheme described above, working bands 1–5 in the clockwise fiber are assigned the same wavelengths as protect bands 1–5 in the counter-clockwise fiber; likewise, protect bands 1–5 in the clockwise fiber are assigned the same wavelengths as working bands 1–5 in the counter-clockwise fiber.

Alternatively, there may be more than one non-switched band. Additional non-switched bands can be added by taking over additional sets of wavelengths normally associated with a working band and its corresponding protect band. Non-switched bands can be used to support the transportation of SONET-protected channels. Protection mechanisms employed by certain SONET equipment may interfere with protection switching used by ring 10. Transporting SONET data over the non-switched band when SONET protection mechanism is to be utilized therefore will ensure that protection switching used by ring 10 is carried out successfully.

In an exemplary embodiment, the working and protect sets of bands in each fiber 25 and the wavelength channels within each band are based on the International Telecommunications Union (ITU) recommendations for use of optical communication channels including the ITU 100 GHz channel spacing plan. FIG. 6 is a table showing an ITU band and channel plan. In order to minimize crosstalk between bands, one wavelength channel is skipped between adjacent bands. The eleven (11) bands used in the exemplary band plan described above extend from $\lambda=1529.55$ nm (f=196.0 THz) to $\lambda=1563.05$ nm (f=191.8 THz).

The two disjoint sets of wavelengths within each fiber 25 can be demultiplexed in a number of ways. For example, if the wavelengths are assigned consecutively in bands into the working and protect sets, a "red/blue" filter can be used to demultiplex the two sets of wavelengths. "Red" or longer wavelengths can be used in the working set and "blue" or shorter wavelengths can be used in the protect set in the clockwise fiber; and likewise, red or longer wavelengths can be used in the protect set and blue or shorter wavelengths can be used in the working set in the counter-clockwise fiber.

There are other approaches to multiplex/demultiplex two disjoint sets of wavelengths. For example, an interleaving approach can be utilized. An interleaver receives as input a bundle of wavelength channels transmitted on one fiber and sends consecutive channels alternately to two output fibers. In this case many wavelength channels may enter an interleaver on fiber A and be partitioned so that "odd" numbered channels may be output on fiber B for "working" traffic and "even" numbered channels may be output on fiber C for "protect" traffic.

When using "red/blue" filters for partitioning a bundle of wavelength channels, component and other filtering limitations make it impractical to use closely spaced channels right up to the "red/blue" boundary. A guard band is typically used to separate the red/blue boundary. Having a guard band facilitates the determination as to whether a particular wavelength falls within the red wavelengths or the blue wavelengths. As described in the above example, band 6 is neither "working" or "protect," instead it is designated as a guard band or non-switched band.

The portion of the spectrum occupied by the non-switched band or guard band would normally be wasted. However, there are applications where some data channels do not require protection at the optical layer. The wavelength channels in the guard band would terminate at the network element and do not require classification as either "working" or "protect." In these cases, having a band filter before the red/blue filter so as to add/drop the guard band permits the use of wavelength channels within this spectrum. This is shown schematically in FIG. 7. As shown therein, signals from fiber 25 are first passed through a band filter which is used to add/drop band 6 thereby allowing wavelength channels within band 6 to be used for other purposes, such as representing "unprotected" traffic. "Unprotected" traffic is defined as traffic which does not have any corresponding "protect" counterpart. Output from the band 6 filter is then passed to the red/blue filter to further separate the red and blue wavelengths.

Where this technique is used, a selection of band filters of varying widths, centered around the guard band, can be employed to provide a varying allocation of the spectrum to the "unprotected" traffic.

Figure 7:
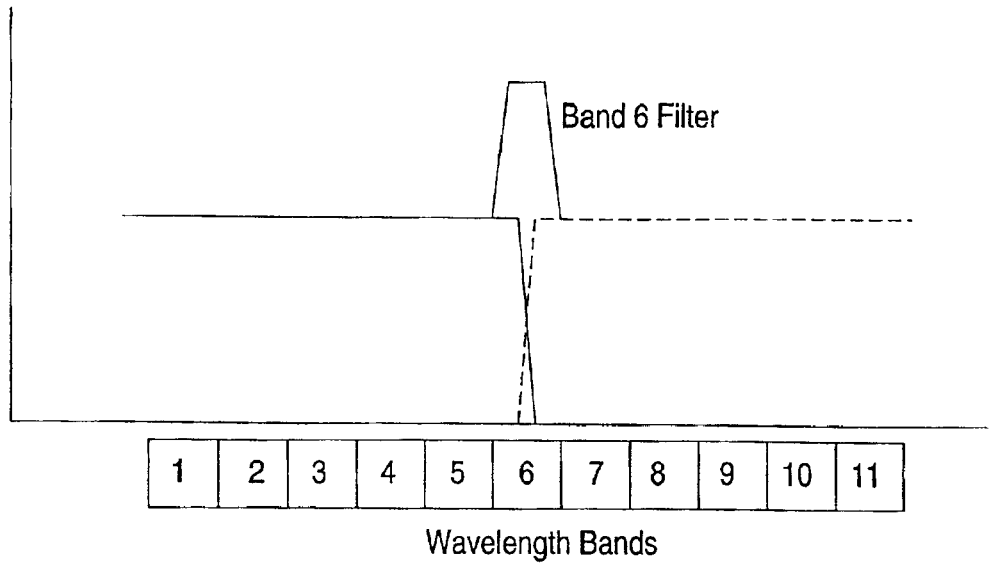
FIG. 7 is a schematic diagram showing a filtering arrangement used to separate two sets of wavelengths without having to discard the wavelengths between the two sets.

In typical optical networks, wavelength channels are allocated in pairs for bi-directional communications between a pair of network ports. For convenience, there would typically be a set of fixed pairings for "transmit" and "receive" channels for working traffic. Using the eleven (11) usable bands within each fiber 25 as described above, one example pairing would be band 1 in clockwise fiber paired with band 7 in counter-clockwise fiber (1/7), band 2 with band 8 (2/8), band 3 with band 9 (3/9), band 4 with band 10 (4/10), and band 5 with band 11 (5/11). This pairing scheme would be affected by a varying center guard band filter used to support a varying number of unprotected channels. This is because the center guard band filter, when adjusted, varies symmetrically around the guard band. Hence, it might affect one of the bands in a band pairing but not both. For example, if the guard band 6 as shown in FIG. 7 is varied symmetrically to include bands 5 and 7, band pairing 1/7 will be affected asymmetrically since only band 7 in the counter-clockwise fiber is included as part of the varied guard band 6.

An alternate assignment of band pairings, however, would alleviate the foregoing problem. According to this alternate assignment scheme, band 1 in clockwise fiber would be paired with band 11 in counter-clockwise fiber (1/11), band 2 with band 10 (2/10), band 3 with band 9 (3/9), band 4 with band 8 (4/8), and band 5 with band 7 (5/7). Using this scheme, it is evident that a varying center guard band will have no asymmetric effect on the band pairings. If the guard band 6 as shown in FIG. 7 is varied symmetrically, both bands 5 and 7 with band pairing 5/7 will be symmetrically affected. As a result, the foregoing band pairing assignment would allow the pairings of bands to be common for networks configured for varying width of the guard band or numbers of unprotected channels.

As described herein, wavelength channels are considered as being in bands 1–11 within each fiber 25. Each band can carry multiple wavelength channels within it. In a dense wavelength division multiplexing (DWDM) system, multiplexing and demultiplexing in bands has the advantage of reducing the number of filters traversed, in the worst case, by the optical signal. With cascaded filters, for example, a bundle of fifteen (15) wavelength channels can be demultiplexed into five (5) bands resulting in a worst case of five (5) filters, and then each band is further demultiplexed into three (3) individual channels (a, b, c) resulting in a worst case of three (3) filters. As a result, the foregoing arrangement produces a worst case of eight (8) filter cascade instead of fifteen (15) filters.

Figure 8:
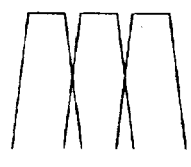
FIG. 8 is a schematic diagram showing a typical filtering arrangement used to separate wavelength channels within a band.
Figure 8:
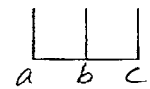

In multiplexing/demultiplexing a group of closely spaced wavelength channels with filters, critical and expensive filter components are often required. For example, in order to demultiplex the three wavelength channels within each band as described above, three narrow filters, such as the 100 GHz filters, are arranged as shown in FIG. 8. Each of the three 100 GHz filters is used to specifically target a corresponding wavelength channel within the band. This approach of using three narrow filters has been shown to be impractical and very expensive.

The requisite number of high performance components, such as the 100 GHz filter, needed in order to separate the three wavelength channels within a band can be reduced as follows. First, one narrow or 100 GHz filter is used to operate on an intermediate wavelength channel. The intermediate wavelength channel is defined as the wavelength channel located between the two outside wavelength channels. Then, the output from the 100 GHz filter is passed to the lower performance components, such as two wide or 200 GHz filters. The two 200 GHz filters operate to demultiplex the two outside wavelength channels.

Figure 9:
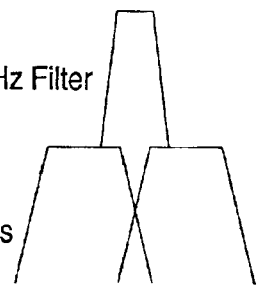
FIG. 9 is a schematic diagram showing a filtering arrangement used to separate wavelength channels within a band in accordance with the present invention.
Figure 9:
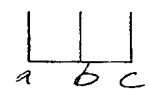

FIG. 9 is a schematic diagram illustrating a filtering arrangement that can be used to separate or demultiplex three wavelength channels within a band. As shown therein, wavelength channels a, b, c are on a 100-GHz grid (a=b+100 GHz, c=b−100 GHz). Wavelength channel b, which is the intermediate wavelength channel, is first dropped with a 100-GHz filter. The remaining wavelength channels a and c are then demultiplexed with two 200-GHz filters respectively.

Similarly, the multiplexing of wavelength channels a, b, c within a band can be achieved using a combination of narrow and wide filters. Wavelength channels a and c are multiplexed first using two 200 GHz filters respectively. The multiplexed output from the two 200 GHz filters are then further multiplexed with wavelength channel b via a 100 GHz filter. By implementing the multiplexing/demultiplexing operations using a combination of narrow and wide filters, the same results can be obtained at a lower cost.

It should be understood that the multiplexing/demultiplexing functions as described above using a combination of narrow and wide filters are not limited to multiplexing/demultiplexing three wavelength channels in a band. It should be apparent to one of ordinary skill in the art that the same techniques can be used to multiplex/demultiplex three groups of wavelength channels in a band.

It is understood that the examples and embodiments described herein are for illustrative purposes only and that various modifications, alternative constructions, and equivalents in light thereof will become apparent or be suggested to persons skilled in the art and are to be included within the spirit and purview of this application. Therefore, the above description should not be taken as limiting the scope of the invention as defined by the claims.

What is claimed is:

1. An optical network comprising:
   first and second adjacent nodes,
   a first fiber configured to carry information in a clockwise direction from the first node to the second node, the first fiber having wavelength capacity allocated to working and protection traffic, the working and protection wavelength capacities in the first fiber being respectively assigned to first and second sets of wavelengths, and
   a second fiber configured to carry information in a counter-clockwise direction from the second node to the first node, the second fiber having wavelength capacity allocated to working and protection traffic, the working and protection wavelength capacities in the second fiber being respectively assigned to the second and first sets of wavelengths,
   wherein the first and second sets of wavelengths are within a wavelength range, and a portion of the wavelength range is not assigned to either the first or second set of wavelengths, the unassigned portion being used to provide isolation between the working and protection wavelength capacities of each of the first and second fibers, wherein
   the wavelength range includes a plurality of bands allocated among the unassigned portion and the first and second sets of wavelengths, and
   one or more of the bands of the first set of wavelengths are interleaved with one or more of the bands of the second set of wavelengths, such that each band of the unassigned portion separates an interleaved band of the first set of wavelengths from an interleaved band of the second set of wavelengths.

2. The optical network of claim 1, wherein each interleaved band of the first and second set of wavelengths, respectively, comprises three wavelength channels, and each band of the unassigned portion comprises three wavelength channels.

3. The optical network of claim 1, wherein
each of the first and second sets of wavelengths, respectively, comprises multiple bands that are grouped together in the wavelength range, and
the first set of wavelengths is separated from the second set of wavelengths by the unassigned portion, the unassigned portion comprising a single band.

4. The optical network of claim 3, wherein each of the bands of the unassigned portion and the first and second sets of wavelengths, respectively, comprises three wavelength channels.

5. The network of claim 1, the network being configured to operate in one of a working and protect state, wherein
in the working state, the first node is configured to transmit traffic in the clockwise direction to the second node as working traffic, which is carried by the working capacity in the first fiber, and
in the protection state, the first node is configured to transmit the traffic in the counter-clockwise direction to the second node as protection traffic, which is carried by the protection capacity in the second fiber.

6. The optical network of claim 5, wherein the optical network is configured to switch from the working state to the protection state in response to a fiber failure.

7. The optical network of claim 1, wherein:
the first node includes:
a first mulitplexing/demultiplexing module operable to send working traffic and receive protection traffic over the working and protection wavelength capacities, respectively, of the first fiber; and
a second mulitplexing/demultiplexing module operable to receive working traffic send protection traffic over the working and protection wavelength capacities, respectively, of the second fiber, and
the second node includes:
a first mulitplexing/demultiplexing module operable to receive working traffic and send protection traffic over the working and protection wavelength capacities, respectively, of the first fiber; and
a second mulitplexing/demultiplexing module operable to send working traffic and receive protection traffic over the working and protection wavelength capacities, respectively, of the second fiber.

8. The optical network of claim 7, wherein each of the first and second mulitplexing/demultiplexing modules in the first and second nodes, respectively, includes:
one or more filters operable to partition the working and protection wavelength capacities in a corresponding one of the first and second fibers.

9. The optical network of claim 1, wherein each of the first and second mulitplexing/demultiplexing modules in the first and second nodes, respectively, includes:
a filter operable to extract the unassigned portion of the wavelength range in a corresponding one of the first and second fibers.

10. An optical network comprising:
first and second adjacent nodes;
a first fiber configured to carry information in a clockwise direction from the first node to the second node, the first fiber having wavelength capacity allocated to working and protection traffic, the working and protection wavelength capacities in the first fiber being respectively assigned to first and second sets of wavelengths; and
a second fiber configured to carry information in a counter-clockwise direction from the second node to the first node, the second fiber having wavelength capacity allocated to working and protection traffic, the working and protection wavelength capacities in the second fiber being respectively assigned to the second and first sets of wavelengths,
wherein the first and second sets of wavelengths are within a wavelength range, and a portion of the wavelength range is not assigned to either the first or second set of wavelengths, the unassigned portion being used to provide isolation between the working and protection wavelength capacities of each of the first and second fibers,
wherein the first and second fibers, respectively, are configured to carry unprotected traffic over the unassigned portion.

11. A method of operating a ring network including first and second nodes operably connected by first and second bi-directional optical fibers, the method comprising:
allocating a first set of wavelength channels in a wavelength range as both working wavelength capacity in the first fiber, and protection wavelength capacity in the second fiber;
allocating a second set of wavelength channels in the wavelength range as both protection wavelength capacity in the second fiber, and working wavelength capacity in the first fiber; and
allocating one or more wavelength channels in the wavelength range as unprotected wavelength capacity in the first and second fibers, wherein the unprotected wavelength capacity is configured to provide isolation between the working and protected wavelength capacities in each of the first and second fibers; wherein
each of the first and second sets of wavelength channels is allocated to comprise a plurality of bands, each band containing one or more adjacent wavelength channels within the wavelength range;
at least some of the bands in the first and second set of wavelength channels are interleaved within the wavelength range, such at least one wavelength channel allocated to the unprotected wavelength capacity separates an interleaved band of the first set of wavelength channels from an interleaved band of the second set of wavelength channels.

12. The method of claim 11, wherein
each of the first and second sets of wavelength channels is allocated to comprise a plurality of adjacent bands in the wavelength range, each band containing one or more wavelength channels,
the bands of the first set of wavelength channels is separated from the bands of the second set of wavelength channels by the wavelength channels allocated to the unprotected wavelength capacity.

13. The method according to claim 11, wherein,
when the ring network is operating in a working state:
transmitting traffic from the first node to the second node over the working wavelength capacity of the first fiber in a clockwise direction with respect to the ring network, and
transmitting traffic from the second node to the first node over the working wavelength capacity in the second fiber in a counter-clockwise direction with respect to the ring network; and when the ring network is operating in a protect state:
  transmitting traffic from the first node to the second node over the protection wavelength capacity on the second fiber in the counter-clockwise direction with respect to the ring network;
  transmitting traffic from the second node to the first node over the protection wavelength capacity in the first fiber in a clockwise direction with respect to the ring network.

14. The method of claim 13, further comprising:

switching the ring network from the working state to the protection state in response to a fiber failure.

15. The method of claim 11, further comprising:

filtering, at each node of the ring network, a signal on the first and second fibers, respectively, to partition the working and protection wavelength capacities.

16. The method of claim 11, further comprising:

performing, at each node of the ring network, two-stage filtering of a signal on the first and second fibers, respectively, the two-stage filtering including:

pre-filtering a signal on the first and second fibers, respectively, to extract the unprotected wavelength capacity of the respective fiber; and filtering the pre-filtered signal of the first and second fibers, respectively, to partition the working and protection wavelength capacities of the respective fiber.

17. A method of operating a ring network including first and second nodes operably connected by first and second bi-directional optical fibers, the method comprising:

allocating a first set of wavelength channels in a wavelength range as both working wavelength capacity in the first fiber, and protection wavelength capacity in the second fiber;

allocating a second set of wavelength channels in the wavelength range as both protection wavelength capacity in the second fiber, and working wavelength capacity in the first fiber;

allocating one or more wavelength channels in the wavelength range as unprotected wavelength capacity in the first and second fibers, wherein the unprotected wavelength capacity is configured to provide isolation between the working and protected wavelength capacities in each of the first and second fibers; and carrying unprotected information between nodes of the ring network over the unprotected wavelength capacities of the first and second fibers, respectively.

* * * * *